United States Patent
Jafarkhani et al.

(10) Patent No.: US 6,445,747 B1
(45) Date of Patent: Sep. 3, 2002

(54) METHOD AND APPARATUS TO REDUCE PEAK TO AVERAGE POWER RATIO IN MULTI-CARRIER MODULATION

(75) Inventors: Hamid Jafarkhani, Middletown; Vahid Tarokh, Hackensack, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/223,767

(22) Filed: Dec. 31, 1998

Related U.S. Application Data

(60) Provisional application No. 60/092,813, filed on Jul. 14, 1998.

(51) Int. Cl.[7] ............................................. H04B 15/00
(52) U.S. Cl. ....................... 375/285; 375/259; 375/267; 375/278; 370/205; 370/206
(58) Field of Search ................................. 375/285, 206, 375/260, 279, 296, 259, 267, 278; 370/203, 206

(56) References Cited

U.S. PATENT DOCUMENTS

| | | | |
|---|---|---|---|
| 4,291,277 A | 9/1981 | Davis et al. | |
| 5,045,799 A | 9/1991 | Holecek | |
| 5,272,724 A | 12/1993 | Solomon et al. | |
| 5,287,387 A | 2/1994 | Birchler | |
| 5,300,894 A | 4/1994 | Myer et al. | |
| 5,302,914 A | 4/1994 | Arntz et al. | |
| 5,381,449 A | 1/1995 | Jasper et al. | |
| 5,490,172 A | 2/1996 | Komara | |
| 5,570,350 A | 10/1996 | Myer et al. | |
| 5,625,871 A | 4/1997 | Myer et al. | |
| 5,694,396 A | 12/1997 | Firouzbakht et al. | |
| 5,696,794 A | 12/1997 | O'Dea | |
| 5,745,846 A | 4/1998 | Myer et al. | |
| 5,783,969 A | 7/1998 | Luz | |
| 5,805,640 A | 9/1998 | O'Dea et al. | |
| 5,835,536 A | 11/1998 | May et al. | |
| 5,838,732 A | 11/1998 | Carney | |
| 6,125,103 A | * 9/2000 | Bauml et al. | ................ 370/203 |
| 6,175,550 B1 | * 1/2001 | van Nee | ...................... 370/206 |

FOREIGN PATENT DOCUMENTS

| | | | |
|---|---|---|---|
| EP | 07702466 A2 | * 12/1996 | ............. H04L/5/06 |
| WO | PCT/GB97/00159 | 7/1997 | |

OTHER PUBLICATIONS

Jones et a., Combined Coding for Error Control and Increased Robustness to System Nonlinearities in OFDM, IEEE, 46th Vehicular Technology Conference, vol. 2, pp. 904–908, 1996.*

Tarokh et al., An Algorithm for Reducing the Peak to Average Power Ratio in a Multicarrier Communication System, 49th Vehicular Technology Conference, vol. 1, pp. 680–683, 1999.*

Wilkinson et al., Minimisation of the Peak to Mean Envelop Power ratio of Multicarrier Transmission Schemes by Block Coding, 45th Vehicular Technology Conference, vol. 2, pp. 825–829, 1995.*

* cited by examiner

*Primary Examiner*—Stephen Chin
*Assistant Examiner*—Shuwang Liu
(74) *Attorney, Agent, or Firm*—Pennie & Edmonds LLP

(57) ABSTRACT

A system and method to reduce a ratio between a peak signal power and an average power (PAPR) in a multi-tone communication system. The system includes an encoder configured to receive a plurality of input bits and to generate a plurality of coded symbols based on the plurality of input bits, and a phase shift calculator configured to calculate a plurality of phase shift values for the coded symbols that minimizes the peak to average power ratio. The system further includes an encoding phase shifter coupled to the encoder and the phase shift calculator, configured to receive the phase shift values from the phase shift calculator and configured to phase shift the plurality of coded symbols to generate a plurality of phase shifted symbols.

17 Claims, 1 Drawing Sheet

METHOD AND APPARATUS TO REDUCE PEAK TO AVERAGE POWER RATIO IN MULTI-CARRIER MODULATION

REFERENCE TO RELATED APPLICATIONS

This application claims the benefit of U.S. Provision Application No. 60/092,813, filed Jul. 14, 1998.

FIELD OF THE INVENTION

This invention relates to communication systems with multi-tone transformation and, in particular, communication systems in which the multi-tone transformed signals are phase shifted in order to reduce their peak to average power ratios.

BACKGROUND OF THE INVENTION

Communication systems with multi-tone transformation are well known in the art. The multi-tone transformation is also referred as a discrete multi-carrier modulation or orthogonal frequency division multiplexing (OFDM).

Multi-tone transformation has widespread practical communication applications including communication systems using twisted pairs of wires which provide high speed wireline communication connections. Further, its hardware implementation lends itself to discrete Fourier Transformation (DFT) structures which are both inexpensive and well understood.

FIG. 1 illustrates a conventional multi-tone transformation transmitter 101 which includes a channel coder 103, a constellation mapper 105, an Inverse Discrete Fourier Transform (IDFT) device 107 and an RF amplifier 109. Illustratively, the output of RF amplifier 109 is provided on a pair of twisted wires 111 or over a wireless communication channel. The channel coder 103 receives a plurality of input bits. The combination of the channel coder 103 and the constellation mapper 105 converts the received input bits to constellation symbols. The constellation symbols are input to the IDFT device 107, and its output signal is fed to the RF amplifier 109. With certain combinations of the constellation symbols, the output signal from IDFT device 107 has peak signals having larger signal magnitudes than that of average signals. This requires that the RF amplifier 109 operate linearly for a wide range of magnitudes in order to avoid clipping the peak signals. Amplifiers that have a wide dynamic range are expensive. Furthermore, practical amplifiers with reasonable dynamic range saturate at a certain peak and may attenuate the peak signals. This is known as the peak to average signal power ratio problem.

A number of possible solutions to the peak to average signal power ratio problem have been suggested. For example, U.S. Pat. No. 5,835,536 (May), which is incorporated herein by reference, teaches a communication system which generates time-domain discrete multi-tone symbols. Its peak to average power requirements are reduced by (1) comparing the magnitude of the time-domain discrete multi-tone symbols with a magnitude threshold and (2) clipping the magnitude of those time-domain discrete multi-tone symbols which have larger magnitudes than that of the magnitude threshold. However, by clipping the magnitudes, it loses information.

In another example, U.S. Pat. No. 5,838,732 (Carney) discloses a multi-channel wireless communication system which produces digital baseband modulated signals by modulating digital baseband channel signals according to its desired interface standard. In order to reduce its peak to average variance, the digital baseband modulated signals are then phase shifted by digital phase shifters.

SUMMARY OF THE INVENTION

The present invention provides a simplified and efficient method and system for reducing the peak to average power ratio (PAPR) in communication systems having multi-tone transformation. This is achieved without changing the error correction capability of the overall system, the encoding rate of its transmitter, and the decoding complexity of its receiver.

The method of the present invention includes the steps of receiving at least one block of bits of information and then generating a codeword which includes an N number of digital multi-tone symbols based on the block of input bits, wherein N is a positive integer. The method further includes the steps of calculating a plurality of phase shift values for the digital multi-tone symbols that minimizes the PAPR and phase shifting the digital multi-tone symbols by the phase shift values, to thereby reduce the PAPR.

The system of the present invention includes an encoder configured to receive a plurality of input bits and to generate a plurality of coded symbols based on the plurality of input bits and a phase shift calculator configured to calculate a plurality of phase shift values for the coded symbols that minimizes the peak to average power ratio. The system further includes an encoding phase shifter coupled to the encoder and the phase shift calculator, configured to receive the phase shift values from the phase shift calculator and configured to phase shift the plurality of coded symbols to generate a plurality of phase shifted symbols and an amplifier coupled to the encoding phase shifter and configured to amplify a plurality of symbols it receives.

DETAILED DESCRIPTION OF THE PREFERRED EMBODIMENTS

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Figure 1:
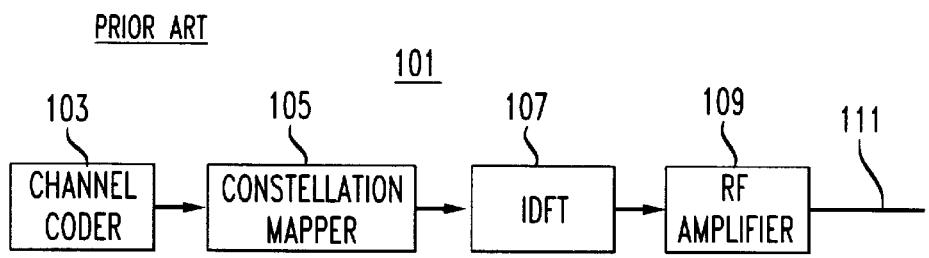
FIG. 1 is a schematic diagram of a conventional transmitter.
Figure 2:
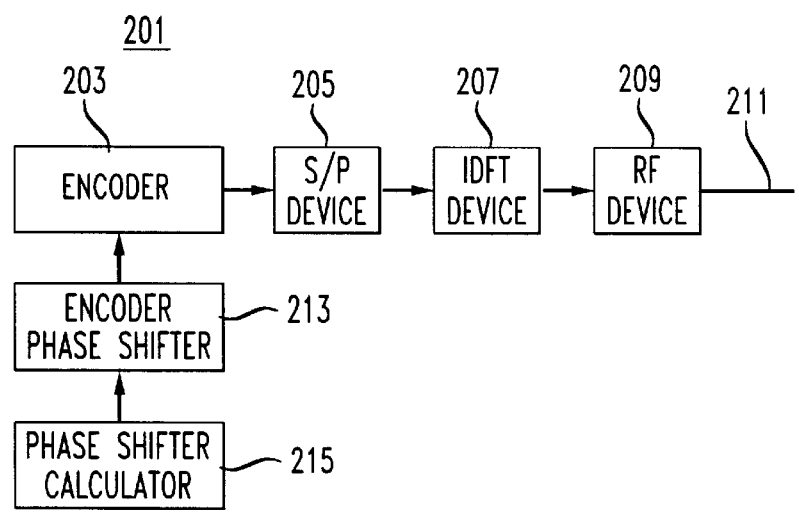
FIG. 2 is a schematic diagram of a transmitter of the present invention.

Referring to FIG. 2, a transmitter 201 of the present invention includes an encoder 203, a serial/parallel device 205, an Inverse Discrete Fourier Transform (IDFT) device 207, an RF device 209, and an encoding phase shifter 213. In the preferred embodiment, a phase shift calculator 215 is provided separate from the transmitter 201. In an alternative embodiment, the phase shift calculator 215 can be provided in the transmitter 201 as well.

The encoder 203 receives blocks $B_T$ of k bits at each predetermined period T=0, T, 2T, . . . The received k bits are encoded into a sequence of N constellation symbols of a constellation Q with $2^a$ elements, where "k" and "a" are each any arbitrary integer. In the preferred embodiment, $N=2^m$ (which allows better and faster hardware implementations). In alternative embodiments, N can be any arbitrary integer. In the preferred embodiment, the encoding rate of the encoder 203 is R=k/aN.

In another preferred embodiment, the encoder 203 is a cascade of a channel coder and a constellation mapper, whereby the channel coder first maps the k input bits into a sequence of the output bits, and then the constellation mapper maps the output bits into a sequence of N constellation symbols. In an alternative embodiment, the encoder 203 is a coded modulator, wherein the encoder uses a coded modulation scheme to map the input bits to the N output constellation symbols. It should be noted that an encoder can be an apparatus or an ensemble of devices (such as the channel coder and the constellation mapper) which generates a sequence of N constellation symbols given an input block of k bits.

Upon processing the k input bits $B_T$, the output of the encoder 203 is a sequence of N constellation symbols $c^0_T, c^1_T, \ldots, c^{N-1}_T$. Any possible output sequence of the encoder 203 is called a codeword (of the encoder). The output of the encoder goes through the serial to parallel device 205 and the IDFT device 207 produces a sequence of symbols $C^0_T, C^1_T, \ldots, C^{N-1}_T$, which are represented as:

$$C^l_T = \sum_{i=0}^{N-1} c^i_T \exp[2\pi l j/N], \tag{1}$$

for l=0, 1, 2, ... N−1, where $j=\sqrt{-1}$.

Alternatively, the IDFT device 207 can be placed before the serial to parallel device 205. In any event, the sequence of symbols is input to the RF device 209 which produces a transmitted signal. The transmitted signal at time t is then given as:

$$S_T(t) = \sum_{i=0}^{N-1} c^i_T \exp[2\pi(f_0 + if_s)jt] \tag{2}$$

for $0 \leq t \leq 1/f_s$, where $f_0$ is the carrier frequency and $f_s$ is the bandwidth of each tone, and preferably $f_s=1/T$.

In one exemplary embodiment, the signal constellation Q is binary phase shift keying (BPSK). This means that the $C^i_T$, i=0,1,...,N−1 are allowed to take only values 1 and −1. In this embodiment, k=N and the encoder 203 maps a sequence of k input bits to N constellation symbols by mapping the i-th input bit $b^i_T$, i=0,1, ... N−1 to the constellation symbol $(-1)^{b^i_T}$. The transmitted signal at time T is then given as:

$$S_T(t) = \sum_{i=0}^{N-1} (-1)^{b^i_T} \exp[2\pi(f_o + if_s)jt], \tag{3}$$

where $$0 \leq t \leq \frac{1}{f_s}.$$

For any arbitrary block of input bits $B_T$, the average power of the above signal is N. Some arrangement of bits, however, allow constructive additions of the instantaneous powers of the components of $S_T(t)$. For instance, the all zero input bit stream 000 . . . 0 is mapped to the sequence of all ones 1, 1, . . . , 1 symbols producing $$\sum_{i=0}^{N-1} \exp[2\pi(f_0 + if_s)jt]$$

at the output of the RF device. This signal has its peak power $N^2$ at time t=0. Thus, in this embodiment, the peak to average power ratio of the transmitted signals can vary within the range 0 to N. As mentioned above, this requires that the amplifier operate linearly for a wide range in order to avoid clipping the peak signals.

The encoding phase shifter 213 and phase shift calculator 215 reduce the peak power of the peak signal. The following is a discussion relating to the theoretical derivation for implementing the encoding phase shifter 213 and phase shift calculator 215.

For the encoder 203, the peak to average power ratio of the encoder 203 is defined to be the maximum possible peak to average power ratio of its codewords of the encoder 203. That is, Peak to Average Power Ratio is defined as:

$$PAPR(C) = \frac{\max}{c \in C}[PAPR(c)] \tag{4}$$

For a codeword $c=c_0 c_1 \ldots c_{N-1}$, $c_0, c_1, \ldots c_{N-1}$ are referred to as the zero-th, the first, ..., and the (N−1)-th coordinates of C, respectively.

The preferred embodiment of the present invention shifts the i-th coordinates of all the codewords of C by a known phase $\phi_i$. Thus, any arbitrary codeword $c=c_0 c_1 \ldots c_{N-1}$ is mapped into:

$$c_0 \exp(j\phi_0) c_1 \exp(j\phi_1) \ldots c_{N-1} \exp(j\phi_{N-1}).$$

The set of all these codewords is denoted by $C(\phi_0, \phi_1, \ldots, \phi_{N-1})$. The output of a corresponding RF device 209 is thus the signal as defined by:

$$s_T(t, \phi_0, \phi_1, \ldots, \phi_{N-1}) = \sum_{i=0}^{N-1} c_i \exp[(2\pi(f_0 + if_s)t + \phi_i)j], \tag{5}$$

for $0 \leq t \leq 1/f_s$.

It can be easily seen that the peak power of $s_T(t, \phi_0, \phi_1, \ldots, \phi_{N-1})$ is given as:

$$\max_{0 \leq t \leq 1/f_s} \left| \sum_{i=0}^{N-1} c_i \exp[(2\pi i f_s t + \phi_i)j] \right|^2 \tag{6}$$

which by a simple normalization is equal to:

$$\max_{0 \leq t \leq 1} \left| \sum_{i=0}^{N-1} c_i \exp[(2\pi i t + \phi_i)j] \right|^2 \tag{7}$$

Furthermore, the average power of $s_T(t, \phi_0, \phi_1, \ldots, \phi_{N-1})$ is $$\sum_{i=0}^{N-1} |c_i|^2.$$

Thus, the peak to average power ratio of the signal $s_T(t)$ is given as:

$$PAPR(c, \phi_0, \phi_1, \ldots, \phi_{N-1}) = \max_{0 \le t \le 1} \frac{\left|\sum_{i=0}^{N-1} c_i \exp[(2\pi i t + \phi_i) j]\right|^2}{\sum_{i=0}^{N-1} |c_i|^2}, \quad (8)$$

which is independent of $f_s$ and only depends on the codeword $c_0 c_1 \ldots c_N$ and the phase shift values $\phi_0, \phi_1, \ldots \phi_{N-1}$. Therefore:

$$PAPR(C(\phi_0, \phi_1, \ldots, \phi_{N-1})) = \max_{c \in C} PAPR(c, \phi_0, \phi_1, \ldots, \phi_{N-1}) \quad (9)$$

depends only on the structure of the encoder 203 and the phases shift values $\phi_0, \phi_1, \ldots, \phi_{N-1}$.

Given that $\phi i$, $i=0, 1, \ldots, N-1$ are chosen appropriately, the code $C(\phi_0, \phi_1, \ldots, \phi_{N-1})$ may have a lower peak to average power ratio than that of the encoder without applying the phase shift values. Indeed, the phase shift values of $\phi_0, \phi_1, \ldots, \phi_{N-1}$ are chosen such that the peak to average power ratio of $C(\phi_0, \phi_1, \ldots, \phi_{N-1})$ is minimized among all the possible choices. Thus the values of $\phi_0, \phi_1, \ldots, \phi_{N-1}$ are given by the minimizing values of the $PAPR(C(\phi_0, \phi_1, \ldots, \phi_{N-1}))$. In mathematical terminology:

$$\arg \min PAPR(C(\phi_0, \phi_1, \ldots, \phi_{N-1})) \quad (10)$$

is computed.

For the encoder 203, the minimizing values $\phi_0, \phi_1, \ldots, \phi_{N-1}$ are computed only once and can be tabulated therein. In the preferred embodiment, the $\phi_0, \phi_1, \ldots, \phi_{N-1}$ are calculated by the phase shift calculator 215, off-line.

The value $PAPR(C(\phi_0, \phi_1, \ldots, \phi_{N-1}))$ can be rewritten as:

$$PAPR(C(\phi_0, \phi_1, \ldots, \phi_{N-1})) = \max_{0 \le t \le 1, c \in C} \frac{\left|\sum_{i=0}^{N-1} c_i \exp[(2\pi i t + \phi_i) j]\right|^2}{\sum_{i=0}^{N-1} |c_i|^2}. \quad (11)$$

It follows that in order to minimize the $PAPR(C(\phi_0, \phi_1, \ldots, \phi_{N-1}))$, values for $\phi_0, \phi_1, \ldots, \phi_{N-1}$ are calculated that attain:

$$\min_{\phi_0, \ldots, \phi_{N-1}} \max_{0 \le t \le 1, c \in C} \frac{\left|\sum_{i=0}^{N-1} c_i \exp[(2\pi i t + \phi_i) j]\right|^2}{\sum_{i=0}^{N-1} |c_i|^2} \quad (12)$$

In other words, Eq. 12 is maximized with respect to codeword $c$, then maximized with respect to $t$ between 0 and 1, and then minimized with respect to $\phi$.

In another embodiment, the transmitted signal at time $t$ is represented as:

$$s(t, \phi_0, \phi_1, \ldots, \phi_{N-1}) = \Re\left(\sum_{i=0}^{N-1} c_i \exp[-(2\pi(f_0 + i f_s) t + \phi_i) j]\right)$$

for $0 \le t \le 1/f_s$, and where $\Re(\text{func}(\ ))$ represents the real part of $\text{func}(\ )$. It follows that:

$$PAPR(C(\phi_0 \phi_1, \ldots, \phi_{N-1}), \varsigma) = \quad (13)$$

$$2 * \max_{0 \le t \le 1, c \in C} \frac{\left|\sum_{i=0}^{N-1} [d_i \cos(2\pi(\varsigma + i) t + \phi_i) + e_i \sin(2\pi(\varsigma + i) t + \phi_i)]\right|^2}{\|c\|^2}$$

where $\varsigma = f_0/f_s \gg 1$, and $c_i = d_i + e_i j$ where $d_i$ and $e_i$ are real and imaginary parts of $c_i$, respectively. Hence, PAPR can be represented as:

$$PAPR(C(\phi_0 \phi_1, \ldots, \phi_{N-1}), \varsigma) = 2 \max_{0 \le t \le 1} g(t, \varsigma), \quad (14)$$

$$g(t, \varsigma) = \max_{c \in C} \frac{\left|\sum_{i=0}^{N-1} [d_i \cos(2\pi(\varsigma + i) t + \phi_i) + e_i \sin(2\pi(\varsigma + i) t + \phi_i)]\right|^2}{\|c\|^2}$$

for $0 \le t \le 1$. In order to efficiently attain the value of function $g(t, \varsigma)$ for each $t$ a codeword $$c = (d_0 + e_0 j, d_1 + e_1 j, \ldots d_{N-1} + e_{N-1} j)$$

is calculated for which its unit vector $\hat{c} = c/\|c\|$ is geometrically the closest to or the farthest from the vector:

$$\hat{\omega}(t, \varsigma) = \frac{1}{\sqrt{N}} (\exp[(2\pi \varsigma t + \phi_0) j],$$
$$\exp[(2\pi(\varsigma + 1) t + \phi_1) j], \ldots, \exp[2\pi(\varsigma + N - 1) t + \phi_{N-1}) j])$$

The above relationship is further explained by defining $$x \cdot y = \sum_{i=0}^{N-1} x_i \bar{y}_i$$

as an inner product of $x$ and $y$, where $x = (x_0 x_1, \ldots, x_{N-1})$ and $y = (y_0 y_1, \ldots, y_{N-1})$. It follows that $g(t, \varsigma) = N|\Re(\hat{c} \cdot \hat{\omega}(t, \varsigma))|^2$, where $\Re(\hat{c} \cdot \hat{\omega}(t, \varsigma))$ is the real part of $(\hat{c} \cdot \hat{\omega}(t, \varsigma))$.

Let $c$ denote the codeword for which $g(t, \varsigma)$ is attained. If $\Re(\hat{c} \cdot \hat{\omega}(t, \varsigma)) \ge 0$, then $c$ maximizes $\Re(\hat{c} \cdot \hat{\omega}(t,\varsigma))$ amongst all codewords. This means that $\|\hat{c} - \hat{\omega}(t,\varsigma)\|^2 = 2 - 2\Re(\hat{c} \cdot \hat{\omega}(t,\varsigma))$ is minimized. Alternatively, if $\Re(\hat{c} \cdot \hat{\omega}(t,\varsigma)) < 0$, then $c$ minimizes $\Re(\hat{c} \cdot \hat{\omega}(t,\varsigma))$ amongst all codewords. This means that $\|\hat{c} - \hat{\omega}(t,\varsigma)\|^2 = 2 - 2\Re(\hat{c} \cdot \hat{\omega}(t,\varsigma))$ is maximized.

The computation of the codeword $c$ is accomplished by using the Viterbi algorithm which is well known in the art. Once the codeword $c$ is calculated, that codeword is used to calculate the $g(t,\varsigma)$. Subsequently, $g(t,\varsigma)$ is maximized with respect to $t$ and then minimized with respect to $\phi$. This step generates the minimizing values of $\phi i$, $i=0,1, \ldots, N-1$.

In alternative embodiments, solutions to minimax problems that are well known in the art can be used to compute the minimizing values of $\phi i$, $i=0,1, \ldots, N-1$. For instance, sequential quadratic programming can be used for solving the above minimax problem defined in Eq. 12.

In one exemplary embodiment, the encoder 203 receives input blocks of length of 4 and generates sequences of binary phase shift keying (BPSK) constellation symbols of length 4. If the i-th bit of the input block is $b_i$, the i-th element of the constellation symbol sequence is $(-1)^{b_i}$. Using the sequential quadratic programming, the following minimizing phase shift values for $\phi_0, \phi_1, \ldots, \phi_{N-1}$ are obtained as:

$\phi_0 = 149.76$, $\phi_1 = 0$, $\phi_2 = 336.6$, and $\phi_3 = 79.56$, where all the angles are given in degrees. The PAPR ($C(\phi_0, \phi_1, \phi_2, \phi_3)$) is 1 dB less than PAPR(C)=6 dB.

In another exemplary embodiment, the encoder 203 receives input blocks of length 8 and outputs sequences of BPSK constellation symbols of length 8. If the i-th bit of the input block is $b_i$, the i-th element of the constellation symbol sequence is $(-1)^{b_i}$. Using the sequential quadratic programming the following minimizing phase shift values for $\phi_0, \phi_1, \ldots, \phi_{N-1}$ are obtained as:

$\phi_0 = 91.16$, $\phi_1 = 39.96$, $\phi_2 = 11.19$, $\phi_3 = 145.8$, $\phi_4 = 243.0$, $\phi_5 = 289.8$, $\phi_6 = 100.44$, and $\phi_7 = 127.08$, where all the angles are given in degrees. The PAPR($C(\phi_0, \phi_1, \phi_2, \ldots, \phi_7)$) is 1.8 dB less than PAPR(C)=9 dB.

To recap, once the phase shift values are calculated by the phase shift calculator 215, the phase shift values are downloaded to and stored in the encoding phase shifter 213. In turn, the encoding phase shifter phase shifts the code words to:

$c_0 \exp(j\psi_0) c_1 \exp(j\psi_1) \ldots c_{N-1} \exp(j\psi_{N-1})$, as described above. Corresponding signals are generated by the serial to parallel device 205, the IDFT device 207, and the RF device 209. The output of the RF device is sent to a receiver via a twisted pair of wires 211. Alternatively, the output of the RF device is sent over a wireless communication channel.

Figure 3:
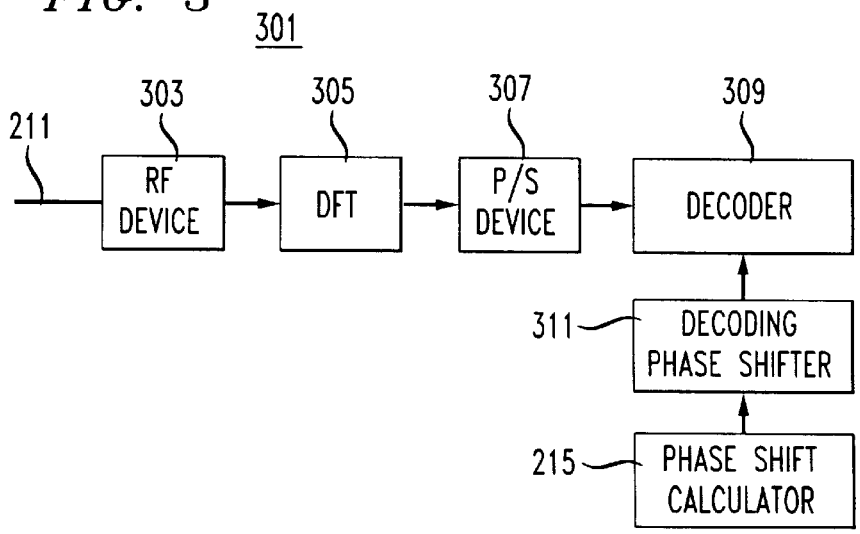
FIG. 3 is a schematic diagram of a receiver of the present invention.

Referring to FIG. 3, a receiver 301 includes an RF device 303, a Discrete Fourier Transform (DFT) device 305, a parallel to serial device 307, a decoder 309, and a decoding phase shifter 311.

The receiver 301 receives the signal $S_T(t)$ perturbed by noise. The RF device 303 processes the received signal and obtains estimates of the parameters $C_T^i$, i=0,1,..., N-1. The DFT device 305 applies discrete Fourier transform on these estimates. The decoder 309 then generates estimates of $c_T^0$, $c_T^1, \ldots, c_T^{N-1}$ from which it extracts the bit block $B_T$ after the phase shifting by the decoding phase shifter 311 is applied. Alternatively, the parallel to serial device 307 can be placed before the DFT device 303.

It should be noted that the phase shift values are downloaded to both the encoding phase shifter 213 and the decoding phase shifter 311. Because the i-th coordinate of all the codewords is phase shifted by a fixed amount $\phi_i$, phase shifts can be compensated in the decoder 309 following the application of the DFr device 305. Thus, these phase shifts do not change the error correction capability, the rate of the encoder, and the decoding complexity of the receiver.

In other words, assuming that the signal coding scheme in the encoder has the desired transmission rate as well as a certain desired error protection level, the present invention reduces the PAPR(C) without reducing the rate or error protection capability of the coding scheme and without increasing the decoding complexity.

It should be understood that various modifications will be readily apparent to those skilled in the art without departing from the scope and spirit of the invention. For example, the present invention can also be applied to Multislit Spectroscopy (see M. J. E. Golay, "Multislit Spectroscopy", *J. Opt. Soc. Amer.*, 39, pp. 437–444, 1949, which is incorporated herein by reference). Accordingly, it is not intended that the scope of the claims appended hereto be limited to the description set forth herein, but rather that the claims be construed as encompassing all the features of patentable novelty that reside in the present invention, including all features that would be treated as equivalents thereof by those skilled in the art to which this invention pertains.

What is claimed is:

1. A method to reduce a ratio between a peak signal power and an average power (PAPR) in a multi-tone communication system, comprising:

receiving a plurality of blocks of bits of information;

generating a plurality of codewords based on the plurality of blocks of bits, each codeword including an N number of digital multi-tone symbols, wherein each of the digital multi-tone symbols in each codeword is designated as an i-th coordinate symbol starting from a 0-th coordinate symbol to a (N−1)-th coordinate symbol and N is a positive integer;

calculating phase shift values for each of the i-th coordinate symbols in order to minimize the PAPR; and phase shifting the digital multi-tone symbols by the phase shift values, to thereby reduce the PAPR.

2. The method according to claim 1 wherein the step of phase shifting the symbols phase shifts each of the i-th coordinate symbols in each codeword by corresponding phase shift value calculated for the i-th coordinate symbol.

3. The method according to claim 2 wherein the calculating step is performed by minimizing the following equation:

$$\max_{0 \leq t \leq 1, c \in C} \frac{\left| \sum_{i=0}^{N-1} c_i \exp[(2\pi i t + \phi_i)j] \right|^2}{\sum_{i=0}^{N-1} |c_i|^2}$$

where c is a digital multi-tone symbol within a set of symbols designated by C and $\phi_i$ is the phase shift value for the i-th coordinate symbol.

4. The method according to claim 3 wherein the minimizing is performed by sequential quadratic programming.

5. The method according to claim 2 wherein the calculating step is performed by minimizing the following equation:

$$\max_{0 \leq t \leq 1} g(t, \varsigma)$$

where $g(t,\zeta)$ is $$\max_{c \in C} \frac{\left|\sum_{i=0}^{N-1}[d_i\cos(2\pi(\varsigma+i)t+\phi_i)+e_i\sin(2\pi(\varsigma+i)t+\phi_i)]\right|^2}{\|c\|^2}$$

where c is a digital multi-tone symbol within a set of symbols designated by C, $c_i = d_i + e_i j$, where $d_i$ and $e_i$ are real and imaginary parts of $c_i$, respectively, $\zeta$ is a bandwidth of a multi-tone channel divided by its carrier frequency, and $\phi_i$ is the phase shift value for the i-th coordinate symbol.

6. The method according to claim 5 wherein the function $g(t,\zeta)$, for a specific value of t is obtained by the following codeword:

$$c = (d_0 + e_0 j, d_1 + e_1 j, \ldots d_{N-1} + e_{N-1} j)$$

wherein its unit vector $\hat{c} = c/\|c\|$ is geometrically one of the closest and furthest from the following vector:

$$\hat{\omega}(t, \varsigma) = \frac{1}{\sqrt{N}}(\exp[(2\pi\varsigma t + \phi_0)j],$$

$$\exp[(2\pi(\varsigma+1)t+\phi_1)j], \ldots, \exp[2\pi(\varsigma+N-1)t+\phi_{N-1})j]).$$

7. The method according to claim 1 wherein the N number of symbols are binary phase shift keying constellation symbols.

8. The method according to claim 1 wherein N is equal to 8.

9. A multi-tone communication system which minimizes its peak to average power ratio (PAPR), the system comprising:
a transmitter configured to transmit a communication signal, the transmitter including:
an encoder configured to receive a plurality of input bits and to generate a plurality of coded symbols based on the plurality of input bits whereby an N number of the coded symbols are grouped as a code word, wherein N is a positive integer and each of the coded symbols in each codeword is designated as an i-th coordinate symbol starting from a 0-th coordinate symbol to a (N−1)-th coordinate symbol;
a phase shift calculator configured to calculate phase shift values for each of the i-th coordinate symbols in order to minimize the PAPR; and
an encoding phase shifter coupled to the encoder and the phase shift calculator and configured to receive the phase shift values from the phase shift calculator and generate a plurality of phase shifted symbols based on the coded symbols and the phase shift values; and
a receiver configured to receive and decode the transmitted signal.

10. The system according to claim 9 wherein the receiver comprises:
an RF device configured to receive the transmitted signal;
a decoding phase shifter coupled to the RF device and configured to receive the phase shift values from the phase shift calculator and generate coded symbols based on the transmitted signal and the phase shift values; and
a decoder coupled to the decoding phase shifter and configured to generate input bits based on the coded symbols.

11. The system according to claim 9 wherein the encoding phase shifter is further configured to shift each of the i-th coordinate symbols in each codeword by a corresponding phase shift value calculated for the i-th coordinate symbol by the phase shift calculator.

12. The system according to claim 9 wherein the phase shift calculator is further configured to calculate the phase shift values by minimizing the following equation:

$$\max_{0 \leq t \leq 1, c \in C} \frac{\left|\sum_{i=0}^{N-1} c_i \exp[(2\pi i t + \varphi_i)j]\right|^2}{\sum_{i=0}^{N-1}|c_i|^2} \quad \text{(Eq. 1)}$$

where c is a coded symbol within a set of symbols designated by C and $\psi_1$ is the phase shift value for the i-th coordinate symbol.

13. The system according to claim 12 wherein the phase shift calculator is further configured to minimize Eq. 1 a sequential quadratic programming.

14. The system according to claim 9 wherein the phase shift calculator is further configured to calculate the phase shift values by minimizing the following equation:

$$\max_{0 \leq t \leq 1} g(t, \varsigma)$$

where $g(t,\zeta)$ is $$\max_{c \in C} \frac{\left|\sum_{i=0}^{N-1}[d_i\cos(2\pi(\varsigma+i)t+\phi_i)+e_i\sin(2\pi(\varsigma+i)t+\phi_i)]\right|^2}{\|c\|^2}$$

where c is a digital multi-tone symbol within a set of symbols designated by C, $c_i = d_i + e_i j$, where $d_i$ and $e_i$ are real and imaginary parts of $c_i$, respectively, $\zeta$ is a bandwidth of a multi-tone channel divided by its carrier frequency, and $\psi_i$ is the phase shift value for the i-th coordinate symbol.

15. The system according to claim 14 wherein the phase shift calculator is further configured to calculate the fiction $g(t,\zeta)$ for a specific value of t by obtaining the following codeword:

$$c = (d_0 + e_0 j, d_1 + e_1 j, \ldots, d_{N-1} + e_{N-1} j)$$

wherein its unit vector $\hat{c} = c/\|c\|$ is geometrically one of closest and furthest from the following vector:

$$\hat{\omega}(t, \varsigma) = \frac{1}{\sqrt{N}}(\exp[(2\pi\varsigma t + \phi_0)j],$$

$$\exp[(2\pi(\varsigma+1)t+\phi_1)j], \ldots, \exp[2\pi(\varsigma+N-1)t+\phi_{N-1})j]).$$

16. The system according to claim 9 wherein the coded symbols are binary phase shift keying constellation symbols.

17. The system according to claim 9 wherein N is equal to 8.

* * * * *